(12) United States Patent
Togashi (10) Patent No.: US 11,627,230 B2
(45) Date of Patent: Apr. 11, 2023

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Takuya Togashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/457,749

(22) Filed: Dec. 6, 2021

(65) Prior Publication Data
US 2023/0057801 A1 Feb. 23, 2023

(30) Foreign Application Priority Data
Aug. 20, 2021 (JP) .............................. JP2021-134927

(51) Int. Cl.
*H04N 1/00* (2006.01)

(52) U.S. Cl.
CPC ..... *H04N 1/00915* (2013.01); *H04N 1/00037* (2013.01); *H04N 1/00896* (2013.01); *H04N 1/00954* (2013.01)

(58) Field of Classification Search
CPC ..................... H04N 1/00915; H04N 1/00954
See application file for complete search history.

(56) References Cited

U.S. PATENT DOCUMENTS

| | | | |
|---|---|---|---|
| 9,310,877 B2 | 4/2016 | Yoshida | |
| 9,380,181 B2 | 6/2016 | Hikichi | |
| 10,165,143 B2 | 12/2018 | Hikichi | |
| 10,866,774 B1* | 12/2020 | Ormond | G06F 3/1263 |
| 10,908,859 B1* | 2/2021 | Yonezawa | G06F 3/1229 |
| 11,327,700 B1* | 5/2022 | Crossen | G06F 3/1204 |
| 2016/0127592 A1* | 5/2016 | Nakamura | H04N 1/0092 358/1.13 |
| 2017/0308341 A1* | 10/2017 | Ormond | H04N 1/00954 |
| 2018/0075032 A1* | 3/2018 | Kimura | G06F 1/3287 |

FOREIGN PATENT DOCUMENTS

| | | |
|---|---|---|
| JP | 2012-243219 A | 12/2012 |
| JP | 2013-175150 A | 9/2013 |

* cited by examiner

*Primary Examiner* — Benjamin O Dulaney
(74) *Attorney, Agent, or Firm* — Sughrue Mion, PLLC (57) ABSTRACT

An information processing apparatus includes a processor configured to, in a case where a time specified processing instruction to execute a specified process at a specified time is set, in response to detecting presence of a user near the information processing apparatus upon restoration from an energy save mode to a normal operation mode, hold a time specified processing instruction scheduled for a past specified time that is time before the restoration, the time specified processing instruction being held not to be executed upon the restoration.

20 Claims, 6 Drawing Sheets

| SPECIFIED TIME | PROCESSING |
| --- | --- |
| 1/10/2021 10:00 | FW UPDATE CHECK |
| 1/10/2021 11:30 | TIME SPECIFIED PRINTING |
| 1/10/2021 16:00 | MAINTENANCE INFORMATION TRANSMISSION |
| 1/10/2021 23:30 | TIME SPECIFIED FAXING |
| 1/11/2021 0:00 | NTP CLOCK CORRECTION |

FIG. 6

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-134927 filed Aug. 20, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 2013-175150 discloses an information processing apparatus that achieves energy saving control without limiting the architecture thereof to a specific architecture. In the energy saving control, power supply is stopped to a central processing unit but is continued to a main memory.

Japanese Unexamined Patent Application Publication No. 2012-243219 discloses a computer capable of quick launch using held information regarding the previous launch. The computer includes a timer, a detector, a determination unit, and a setting unit. The timer measures time and generates an interruption at a set time. The detector detects whether a power-off instruction or a power-on instruction is given. If the detector detects power-off, the determination unit determines whether quick launch is enabled. If the determination unit determines that the quick launch is enabled, the setting unit disables the interruption caused by the timer.

SUMMARY

In executing a time specified processing instruction such as a time specified job, an information processing apparatus such as a multi-function printer executes a process in response to a notification from the timer. The information processing apparatus has an energy save mode for stopping some functions including the function of a processor, and thus a timer is also stopped in the energy save mode. When intending to perform an operation on the information processing apparatus in the energy save mode, a user causes the mode of the information processing apparatus to be restored from the energy save mode. Upon the restoration, a time specified processing instruction scheduled for a past specified time that is time before the restoration is executed before the intended operation and thus prevents the user from performing the intended operation immediately, which leads to a low usability.

Aspects of non-limiting embodiments of the present disclosure relate to an information processing apparatus, an information processing method, and a non-transitory computer readable medium that prevent, upon restoration from an energy save mode to a normal operation mode, a user operation from being hindered by the execution of a time specified processing instruction scheduled for a past specified time.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: in a case where a time specified processing instruction to execute a specified process at a specified time is set, in response to detecting presence of a user near the information processing apparatus upon restoration from an energy save mode to a normal operation mode, hold a time specified processing instruction scheduled for a past specified time that is time before the restoration, the time specified processing instruction being held not to be executed upon the restoration.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment to implement the present disclosure will be described in detail with reference to the drawings.

Figure 1:
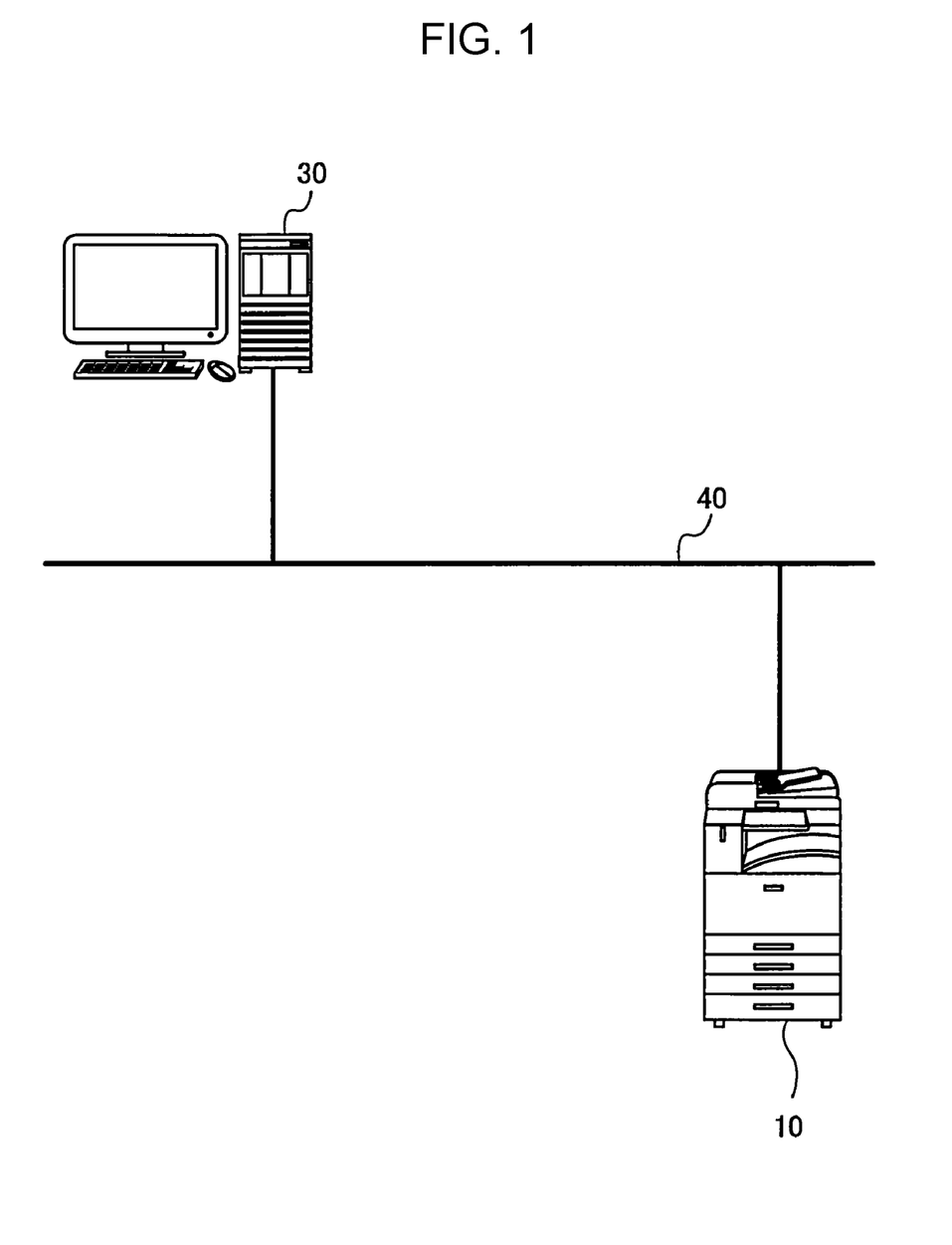
FIG. 1 is a diagram illustrating the system configuration of an image forming system of the exemplary embodiment of the present disclosure.

FIG. 1 is a diagram illustrating the configuration of an image forming system of the exemplary embodiment of the present disclosure.

As illustrated in FIG. 1, the image forming system of the exemplary embodiment of the present disclosure includes an image forming apparatus 10 and a terminal apparatus 30 that are connected to each other via a network 40. The terminal apparatus 30 generates print data and transmits the print data to the image forming apparatus 10 via the network 40. The image forming apparatus 10 receives the print data transmitted from the terminal apparatus 30 and outputs an image corresponding to the print data on a sheet. The image forming apparatus 10 is an apparatus called a multi-function printer having multiple functions such as a printing function, a scanning function, and a copying function and is an example of an information processing apparatus in the present disclosure.

Figure 2:
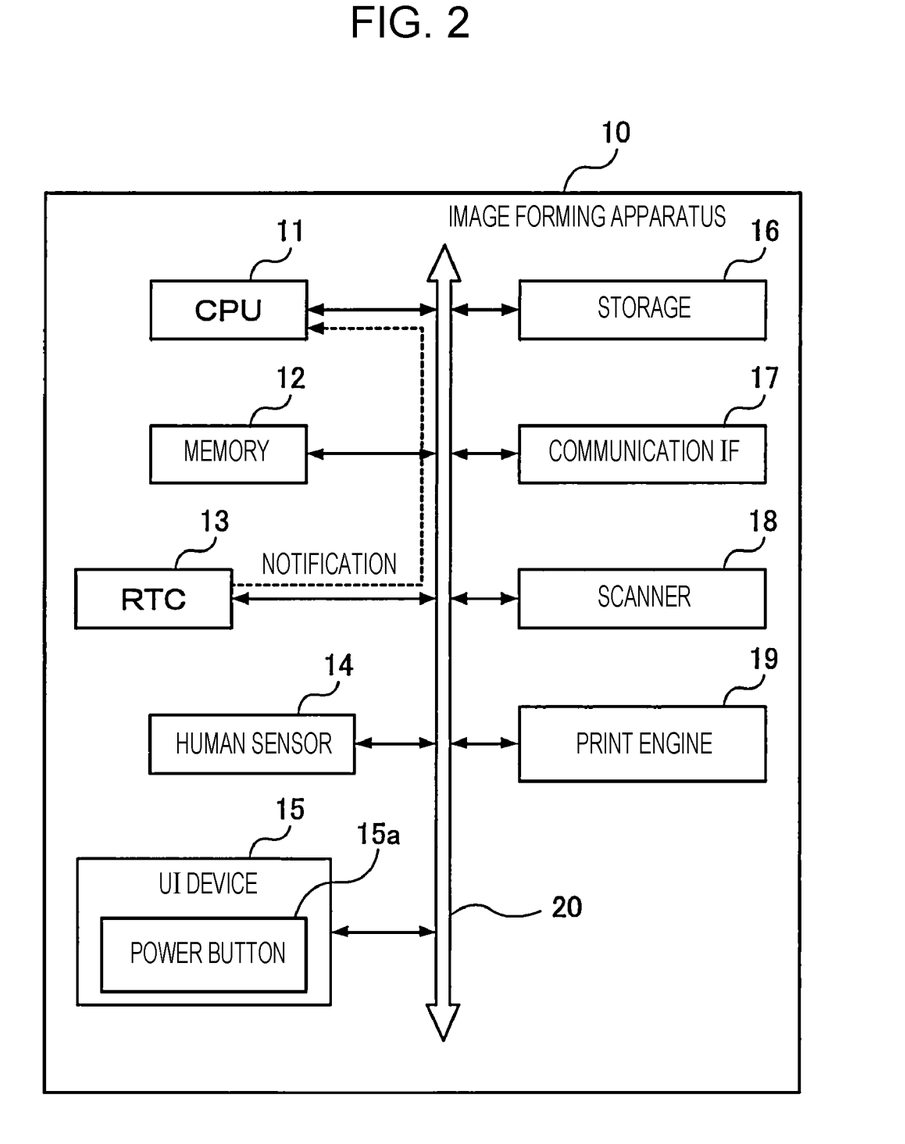
FIG. 2 is a block diagram illustrating the hardware configuration of an image forming apparatus in the exemplary embodiment of the present disclosure.

FIG. 2 illustrates the hardware configuration of the image forming apparatus 10 in the image forming system of this exemplary embodiment. As illustrated in FIG. 2, the image forming apparatus 10 includes a central processing unit (CPU) 11, a memory 12, a real-time clock (RTC) 13, a human sensor 14, a user interface (UI) device 15, a storage 16 such as a hard disk drive, a communication interface (IF) 17 that transmits and receives data to and from an external apparatus, a scanner 18, and a print engine 19. These components are connected to each other via a control bus 20.

The CPU 11 is a processor that executes a predetermined process on the basis of a control program stored in the storage 16 and controls the operations of the image forming apparatus 10. In the description for this exemplary embodiment, the CPU 11 reads out and runs the control program stored in the memory 12 or the storage 16, but the program stored in a storage medium such as a compact disc read only memory (CD-ROM) may be provided to the CPU 11.

The RTC 13 measures an elapsed time and transmits a notification at a set time.

The human sensor 14 is a sensor for detecting the presence of a user near the image forming apparatus 10 and, for example, any of various publicly known sensors such as an infrared-ray sensor is usable therefor.

The UI device 15 includes a power button 15a operating in conjunction with software and, for example, an operation panel configured as a touch panel. The operation panel is used to display various pieces of information to the user and receives an operation from the user.

The communication IF 17 includes communication interfaces that transmit and receive data to and from external apparatuses and the like via the network 40 and a universal serial bus (USB). The scanner 18 reads a document image from a set document. The print engine 19 prints an image on the recording medium such as a printing sheet after steps of charging, exposure, development, transfer, fixing, and the like.

The types of the operation modes of the image forming apparatus 10 in this exemplary embodiment will be described. The image forming apparatus 10 in this exemplary embodiment includes a hardware switch (not illustrated). In a state where the hardware switch is off, power supply to the image forming apparatus 10 is stopped, and the operations of the image forming apparatus 10 are completely stopped.

In a state where the hardware switch is on, the image forming apparatus 10 in this exemplary embodiment has three operation modes: a power-off mode, a normal operation mode, and an energy save mode.

Suppose that the power button 15a is pressed or an instruction to restore the mode to the normal operation mode is received from the terminal apparatus 30, with the hardware switch (not illustrated) of the image forming apparatus 10 in the power-off mode being on. In response to the pressing or receiving, the CPU 11 causes the image forming apparatus 10 to enter the normal operation mode. In response to slow pressing of the power button 15a with the image forming apparatus 10 in the normal operation mode, the CPU 11 causes the image forming apparatus 10 to enter the power-off mode from the normal operation mode. In response to quick pressing of the power button 15a with the image forming apparatus 10 in the normal operation mode, the CPU 11 causes the image forming apparatus 10 to enter the energy save mode from the normal operation mode.

The slow pressing of the power button 15a denotes keeping pressing the power button 15a for a period of time longer than or equal to a period of time set in advance. The quick pressing of the power button 15a denotes keeping pressing the power button 15a for a period of time shorter than the period of time set in advance. For example, keeping pressing the power button 15a for a period of time longer than or equal to two seconds is the slow pressing of the power button 15a, and keeping pressing the power button 15a for a period of time shorter than two seconds is the quick pressing of the power button 15a.

The power-off mode is a state where power supply to all of the hardware components of the image forming apparatus 10 is stopped except supply of stand-by power required for detection of the pressing of the power button 15a or the like and where the operations of the image forming apparatus 10 are thus stopped.

The normal operation mode is a state where normal power is supplied to all of the hardware components of the image forming apparatus 10 and where the image forming apparatus 10 is ready to perform a normal operation. When the image forming apparatus 10 is in the normal operation mode, the CPU 11 is also in the normal operation mode. To transition from the power-off mode to the normal operation mode, the CPU 11 becomes active starting with the initial state. In other words, the CPU 11 reads out the control program stored in the storage 16, loads the program into the memory 12, and executes a predetermined process. The CPU 11 thereby causes the image forming apparatus 10 to operate in the normal operation mode.

In the energy save mode, normal power is supplied only to the memory 12, the human sensor 14, and the power button 15a of the UI device 15. The CPU 11 is supplied with the stand-by power only. Power supply to the other hardware components is stopped. The functions of the image forming apparatus 10 are stopped. When the image forming apparatus 10 is in the energy save mode, the CPU 11 is also in the energy save mode in which the function thereof is stopped, that is, a mode called a suspend mode.

Even if the CPU 11 is running the control program, the CPU 11 stops the operation halfway and enters the suspend mode. In the energy save mode, the memory 12 keeps information regarding information stored halfway while the CPU 11 is running the program. To restore the mode of the CPU 11 from the suspend mode to the normal operation mode, the information stored in the memory 12 may thus be used for high-speed launch of the CPU 11. The high-speed launch of the CPU 11 is typically called quick boot. That is, time taken to restore the mode of the CPU 11 from the suspend mode to the normal operation mode (time taken to perform the quick boot) is shorter than time taken to transition the mode of the CPU 11 from the power-off mode to the normal operation mode.

In a case where a time specified processing instruction to execute a specified process at a specified time is set, the CPU 11 sets, in the RTC 13, time at which the time specified processing instruction is to be executed. As illustrated in FIG. 2, the RTC 13 transmits a notification to the CPU 11 at the set time. Upon receiving the notification from the RTC 13, the CPU 11 executes the time specified processing instruction scheduled for the reception time.

The time specified processing instruction is an instruction to execute a specified process at a specified time. As examples of the time specified processing instruction, time specified faxing, time specified printing, time specified power-on, firmware (FW) update check, maintenance information transmission, and network time protocol (NTP) clock correction are cited.

Figure 3:
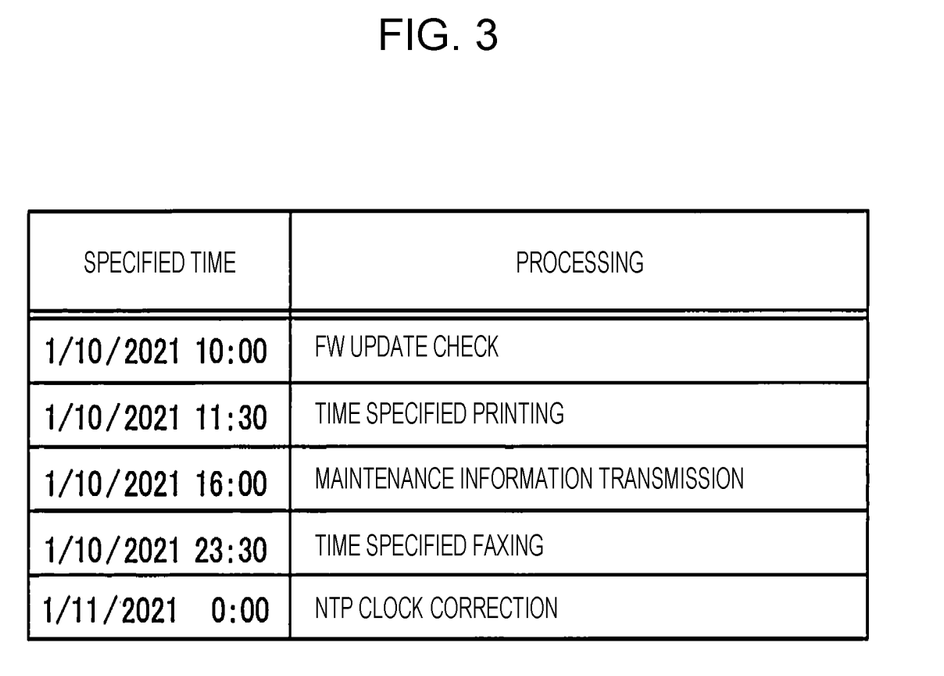
FIG. 3 is a diagram illustrating a time specified processing instruction list of the image forming apparatus in the exemplary embodiment of the present disclosure.

If the user sets a time specified processing instruction, the CPU 11 registers the time specified processing instruction set by the user in a time specified processing instruction list in chronological order of the specified time, as illustrated in FIG. 3. The time specified processing instruction list is stored in the memory 12. The CPU 11 performs a setting operation on the RTC 13 to transmit a notification at the specified time to execute the time specified processing instruction.

Figure 4:
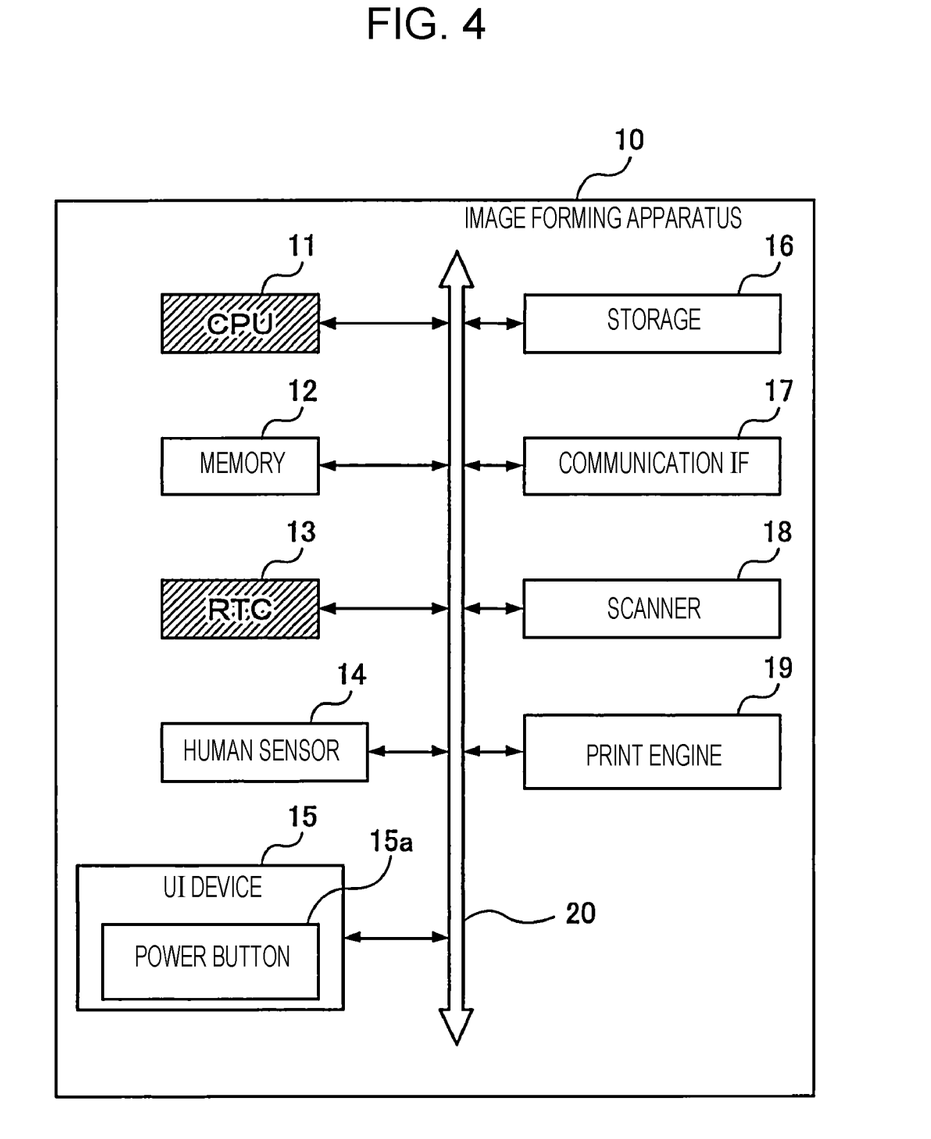
FIG. 4 is a block diagram illustrating a power supply state of the image forming apparatus in an energy save mode.

FIG. 4 is a block diagram illustrating the power supply state of the image forming apparatus 10 in the energy save mode. In FIG. 4, components subjected to power supply stopping and control are hatched.

As illustrated in FIG. 4, in the image forming apparatus 10 in the energy save mode, power supply to the RTC 13 is stopped, and the function of the RTC 13 is stopped. Accordingly, if the specified time to execute the time specified processing instruction arrives while the image forming apparatus 10 is in the energy save mode, the stopping state prevents the RTC 13 from transmitting a notification to the CPU 11. In other words, while the image forming apparatus 10 is in the energy save mode, it is not possible for the CPU 11 to execute the time specified processing instruction.

An image forming apparatus in the related art thus has a low usability as below. Specifically, in response to the user causing the mode of the image forming apparatus to be restored from the energy save mode to the normal operation mode to perform a user operation, a time specified processing instruction scheduled for a past specified time that is time before the restoration is executed before the user operation. In this case, the user is prevented from performing the intended operation immediately.

In this exemplary embodiment, the CPU 11 is configured as below. In a case where a time specified processing instruction to execute a specified process at a specified time is set, in response to detecting the presence of the user near the image forming apparatus 10 upon the restoration from the energy save mode to the normal operation mode, the CPU 11 holds a time specified processing instruction scheduled for a past specified time not to execute the time specified processing instruction upon the restoration.

According to this aspect, it is possible to prevent, upon the restoration from the energy save mode to the normal operation mode, a user operation from being hindered by the execution of a time specified processing instruction scheduled for a past specified time.

The CPU 11 may detect the presence of the user near the image forming apparatus 10 by using the human sensor 14 installed in the image forming apparatus 10. Alternatively, in a case where an operation is being performed on the image forming apparatus 10, the CPU 11 may detect the presence of the user near the image forming apparatus 10.

Note that the case where an operation is being performed on the image forming apparatus 10 may correspond to, for example, a case where an operation of the UI device 15 is detected. If the touch panel or buttons of the UI device 15 are configured to light up in an operation receivable state, a case where the touch panel or the buttons light up may be regarded as the case where the operation is being performed on the image forming apparatus 10. In addition, a case where the image forming apparatus 10 is in a log-in state regarding the user may be regarded as the case where the operation is being performed on the image forming apparatus 10.

Figure 5:
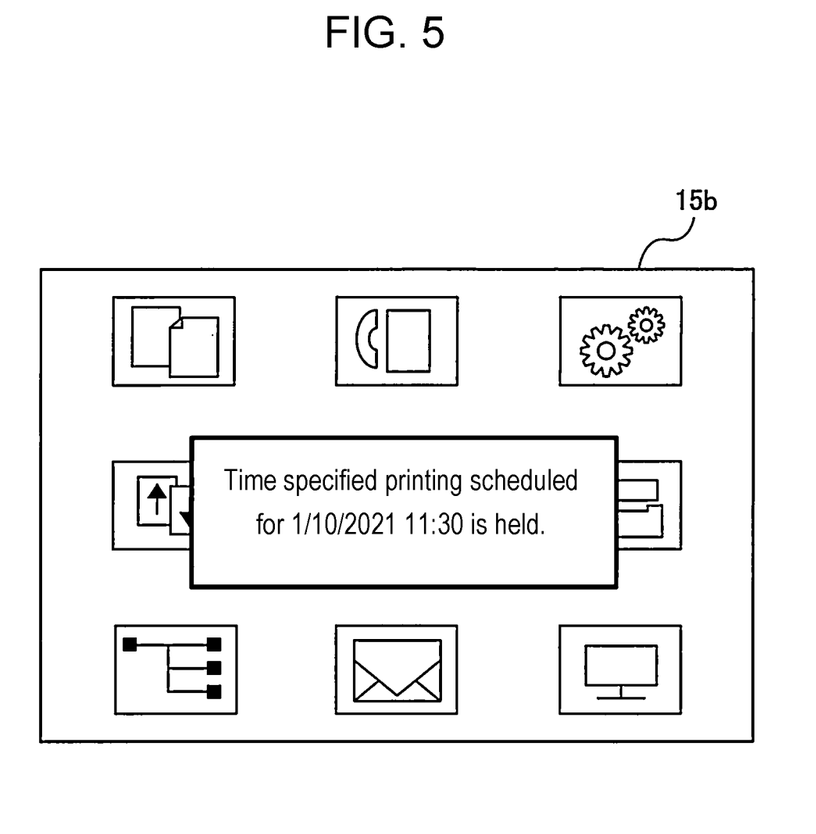
FIG. 5 is a diagram illustrating an example notification of a time specified processing instruction held not to be executed.

The CPU 11 may notify the user of a time specified processing instruction held not to be executed. As the notification, for example, as illustrated in FIG. 5, the time specified processing instruction held not to be executed may be displayed on an operation panel 15b or notified with a sound.

In addition, in response to detecting the user leaving the image forming apparatus 10, the CPU 11 may execute the held time specified processing instruction.

The CPU 11 may detect the user leaving the image forming apparatus 10 by using the human sensor 14 installed in the image forming apparatus 10.

In addition, in response to the detection of the termination of the user operation, the CPU 11 may execute the held time specified processing instruction.

In response to the elapse of time which is longer than or equal to time set in advance and in which the operation is not performed on the image forming apparatus 10, the CPU 11 may detect the termination of the user operation. In response to a log-out operation performed on the image forming apparatus 10, the CPU 11 may detect the termination of the user operation. If a condition for transitioning to the energy save mode for the first time after the restoration from the energy save mode to the normal operation mode is satisfied, the CPU 11 may detect the termination of the user operation. In addition, suppose the case where the touch panel and the buttons included in the UI device 15 are configured to light up in the operation receivable state. In this case, in response to the change of the state of the light of the touch panel and the buttons from an on state to an off state, the CPU 11 may detect the termination of the user operation. If the touch panel included in the UI device 15 is configured to transition to an initial screen in response to no operation in a predetermined time period, and if the screen of the touch panel in an operated state transitions to the initial screen, the CPU 11 may detect the termination of the user operation.

Figure 6:
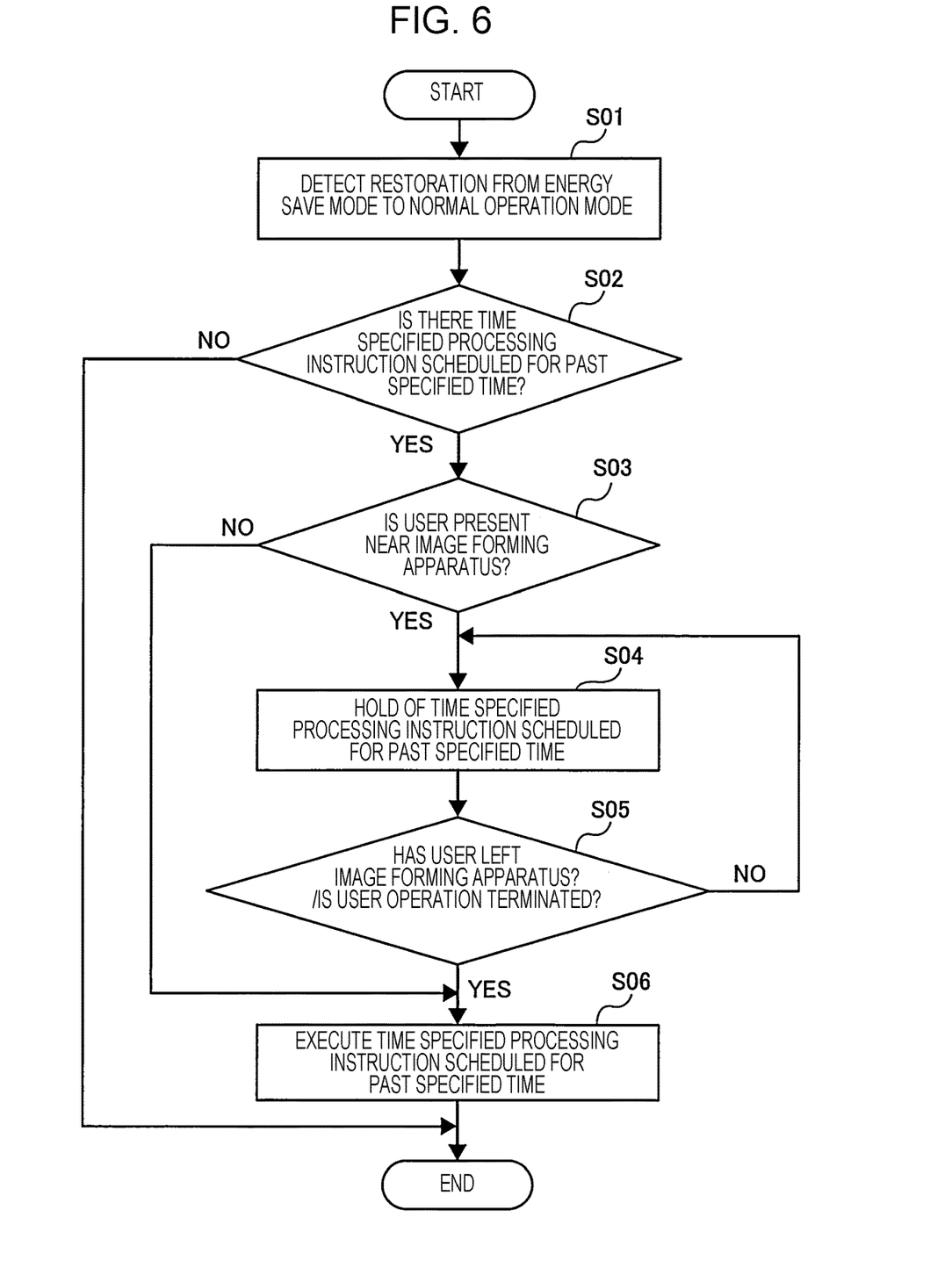
FIG. 6 is a flowchart for explaining a process for restoration from the energy save mode to a normal operation mode executed by the image forming apparatus.

An overview of a process for the restoration from the energy save mode to the normal operation mode executed by the image forming apparatus 10 of this exemplary embodiment will be described with reference to a flowchart in FIG. 6.

First, in response to detecting the restoration of the mode of the image forming apparatus 10 from the energy save mode to the normal operation mode in step S01, the CPU 11 determines in step S02 whether there is a time specified processing instruction scheduled for a specified time past the restoration time point.

If it is determined in step S02 that there is not a time specified processing instruction scheduled for a past specified time (determination result: No), the CPU 11 terminates the process for the restoration to the normal operation mode and enters into the normal operation mode without executing any other process.

If it is determined in step S02 that there is a time specified processing instruction scheduled for a past specified time (determination result: Yes), the CPU 11 determines in step S03 whether the user is present near the image forming apparatus 10.

If it is determined in step S03 that the user is present near the image forming apparatus 10 (determination result: Yes), the CPU 11 holds, in step S04, the time specified processing instruction scheduled for the past specified time not to execute the time specified processing instruction.

In step S05, the CPU 11 then determines whether the user has left the image forming apparatus 10 and whether the operation by the user is terminated.

If it is determined in step S05 that the user has left the image forming apparatus 10 or that the operation by the user is terminated (determination result: Yes), the CPU 11 executes the time specified processing instruction scheduled for the past specified time in step S06, then terminates the process for the restoration to the normal operation mode, and enters into the normal operation mode without executing any other process.

If it is determined in step S05 that the user has not left the image forming apparatus 10 or that the operation by the user is not terminated (determination result: No), the CPU 11 returns to step S04 and continues holding the time specified processing instruction scheduled for the past specified time.

If it is determined in step S03 that the user is not present near the image forming apparatus 10 (determination result: No), the CPU 11 proceeds to step S06, executes the time specified processing instruction scheduled for the past specified time, then terminates the process for the restoration to the normal operation mode, and enters into the normal operation mode without executing any other process.

In this exemplary embodiment, if the CPU 11 detects the presence of the user near the image forming apparatus 10 upon the restoration from the energy save mode to the normal operation mode, but if a preset period of time has elapsed since the past specified time for the time specified processing instruction, the CPU 11 may execute the time specified processing instruction before an instruction involved with the user operation, without holding the time specified processing instruction.

The CPU 11 may also execute multiple time specified processing instructions in order set in advance, regardless of the specified time.

In response to the presence of a time specified processing instruction not satisfying a condition set in advance included in multiple time specified processing instructions scheduled for respective past specified times, the CPU 11 may move an execution target to a time specified processing instruction scheduled for a past specified time subsequent to the time specified processing instruction not satisfying the condition included in the time specified processing instructions scheduled for the respective past specified times, without waiting until the time specified processing instruction not satisfying the condition is executed.

MODIFICATION

The image forming system of the exemplary embodiment of the present disclosure has heretofore been described; however, the present disclosure is not limited to the exemplary embodiment described above and may be modified appropriately.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The case where the present disclosure is applied to the image forming apparatus has heretofore been described for the exemplary embodiment above; however, the present disclosure is not limited to this case and is applicable to various apparatuses.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
      in a case where a time specified processing instruction to execute a specified process at a specified time is set, in response to detecting presence of a user near the information processing apparatus upon restoration from an energy save mode to a normal operation mode, hold a time specified processing instruction scheduled for a past specified time that is time before the restoration, the time specified processing instruction being held not to be executed upon the restoration.

2. The information processing apparatus according to claim 1,
   wherein the processor is configured to:
      detect the presence of the user near the information processing apparatus by using a human sensor installed in the information processing apparatus.

3. The information processing apparatus according to claim 2,
   wherein the processor is configured to:
      in response to detecting the user leaving the information processing apparatus, execute the held time specified processing instruction.

4. The information processing apparatus according to claim 3,
   wherein the processor is configured to:
      detect the user leaving the information processing apparatus by using the human sensor installed in the information processing apparatus.

5. The information processing apparatus according to claim 2,
   wherein the processor is configured to:
      in response to detection of termination of an operation by the user, execute the held time specified processing instruction.

6. The information processing apparatus according to claim 1,
   wherein the processor is configured to:
      in response to an operation being performed on the information processing apparatus, detect the presence of the user near the information processing apparatus.

7. The information processing apparatus according to claim 6,
   wherein the processor is configured to:
      in response to detecting the user leaving the information processing apparatus, execute the held time specified processing instruction.

8. The information processing apparatus according to claim 7,
   wherein the processor is configured to:
      detect the user leaving the information processing apparatus by using a human sensor installed in the information processing apparatus.

9. The information processing apparatus according to claim 6,
   wherein the processor is configured to:
      in response to detection of termination of the operation by the user, execute the held time specified processing instruction.

10. The information processing apparatus according to claim 1,
wherein the processor is configured to:
in response to detecting the user leaving the information processing apparatus, execute the held time specified processing instruction.

11. The information processing apparatus according to claim 10,
wherein the processor is configured to:
detect the user leaving the information processing apparatus by using a human sensor installed in the information processing apparatus.

12. The information processing apparatus according to claim 1,
wherein the processor is configured to:
in response to detection of termination of an operation by the user, execute the held time specified processing instruction.

13. The information processing apparatus according to claim 12,
wherein the processor is configured to:
in response to elapse of time which is longer than or equal to time set in advance and in which the operation is not performed on the information processing apparatus, detect the termination of the operation by the user.

14. The information processing apparatus according to claim 12,
wherein the processor is configured to:
in response to a log-out operation performed on the information processing apparatus, detect the termination of the operation by the user.

15. The information processing apparatus according to claim 1,
wherein the processor is configured to:
despite detecting the presence of the user near the information processing apparatus, execute a time specified processing instruction scheduled for a past specified time in response to elapse of a preset period of time after the past specified time.

16. The information processing apparatus according to claim 1,
wherein the processor is configured to:
execute a plurality of the time specified processing instructions in order set in advance, regardless of the specified time.

17. The information processing apparatus according to claim 1,
wherein the processor is configured to:
notify the user of the time specified processing instruction held not to be executed.

18. The information processing apparatus according to claim 1,
wherein the processor is configured to:
in response to presence of a time specified processing instruction not satisfying a condition set in advance included in a plurality of the time specified processing instructions scheduled for the respective past specified times, move an execution target to a time specified processing instruction scheduled for a past specified time subsequent to the time specified processing instruction not satisfying the condition included in the time specified processing instructions scheduled for the respective past specified times.

19. An information processing method comprising:
in a case where a time specified processing instruction to execute a specified process at a specified time is set, in response to detecting presence of a user near an information processing apparatus upon restoration from an energy save mode to a normal operation mode, holding a time specified processing instruction scheduled for a past specified time that is time before the restoration, the time specified processing instruction being held not to be executed upon the restoration.

20. A non-transitory computer readable medium storing a program causing a computer to execute a process comprising:
in a case where a time specified processing instruction to execute a specified process at a specified time is set, in response to detecting presence of a user near an information processing apparatus upon restoration from an energy save mode to a normal operation mode, holding a time specified processing instruction scheduled for a past specified time that is time before the restoration, the time specified processing instruction being held not to be executed upon the restoration.

* * * * *